June 23, 1970            H. SCHMIDT            3,516,734
LENS SYSTEM FOR POSITIONING AN IMAGE RECORDER
REMOTELY FROM AN APERTURE
Filed April 25, 1966
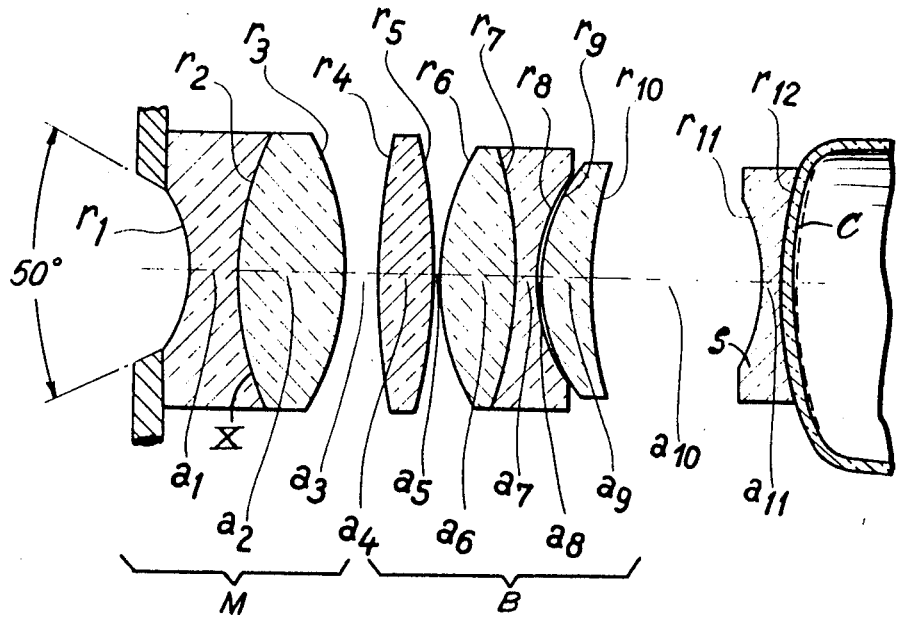
INVENTOR
HORST SCHMIDT.
BY
ATTORNEY.

United States Patent Office 3,516,734
Patented June 23, 1970

3,516,734
LENS SYSTEM FOR POSITIONING AN IMAGE RECORDER REMOTELY FROM AN APERTURE
Horst Schmidt, Nauborn, Kreis Wetzlar, Germany, assignor to Ernst Leitz GmbH, Wetzlar, Germany
Filed Apr. 25, 1966, Ser. No. 544,749
Claims priority, application Germany, May 8, 1965, L 50,664
Int. Cl. G02b 9/04, 9/60
U.S. Cl. 350—216                5 Claims

ABSTRACT OF THE DISCLOSURE

A lens system for use where wide field viewing is desired through apertures or ports in heat shields, armored walls, etc., and where it is desired that the image plane be remote from the shield or wall. The system includes a reversed Galilean telescope objective coacting with a basic lens, and may include a Smythe lens to flatten the image for projection on the cathode of an image converter.

---

The invention relates to lenses of great overall length, which are particularly suited for special applications.

Summary of the invention

The primary object of the present invention is to provide a lens of sufficient overall length so that the image plane can be arranged at a relatively great distance from an aperture in a shield barrier, or the like.

Such a lens can be used, for instance when a camera must be protected from high intensity thermal radiation during the taking of photographs of very hot objects, and a thick, transparent guard plate must be placed between said aperture and the lens. It also has application as a wide-field lens for night telescopes. It is desirable, for example, when pictures are taken from inside of armored vehicles to keep the physical opening for the placement of a lens as small as possible and yet to get a large field of view under conditions of large separation between aperture and constant-sized image plane.

Other objects and many of the advantages of the present invention will become apparent to those skilled in the art from the following description considered in connection with the accompanying drawing.

Brief description of the drawing

The only figure of the drawing is a longitudinal section along the axis of a lens embodying the invention.

Description of the preferred embodiment

For purposes of clarity in the following description, the front or objective, system of the invention end of the lens is defined as that end into which light enters and which is shown at the left side of the figure, while the back end of the lens system is shown as that end located at the right side of the figure. Referring in detail to the figure, the lens system of the present invention may be seen to be composed of a basic lens B, which can take the form of a multi-element lens, and an objective member M that functions as a reversed Galilean telescope objective. When using the lens system of the invention in conjunction with an image converter, it is advantageous to use a Smythe lens or field flattener (cf., pages 140, 141, and 481 of Fundamentals of Optical Engineering, by Donald H. Jacobs, McGraw-Hill Book Co., 1943) S to fit the curvature of the image field to the cathode surface C of the converter. The objective member is preferably designed as a thick meniscus lens having its front surface provided with negative refracting power and its surface facing the image with positive refracting power. The frontal objective member exhibits over-correction with regard to spherical aberration and astigmatism and under-correction with regard to coma. The basic lens B is oppositely corrected with respect to these aberrations of the image. For the purpose of chromatic correction and improvement of the spherical zone and the Gauss aberration, it is advantageous to place a chromatically over-corrected and a monochromatically under-corrected, cemented surface in the objective member.

The thick meniscus objective member M has a fixed telescopic magnification. In a telescope, a bundle of light rays coming from infinity are again focused at infinity. The ratio of the diameters of the two bundles is equivalent to the magnification ratio. In the case of a telescope, this means the ratio of the diameter of the front lens to the internal diameter of the exit pupil. The internal diameter of the exit pupil can be observed as a bright surface when the telescope is held at a somewhat greater distance from the eye. Telescopes are characterized by this ratio. Thus, for instance, a telescope with a magnification of 8-times may have a 32 mm. free diameter for the front lens and a 4 mm. exit pupil diameter.

In the present case, the thick meniscus functions as such a telescope, but in reverse. A bundle of rays coming from infinity and falling on the concave front surface of the meniscus can naturally only have a diameter equal to the chord of the arc characterized by $r_1$. As a result of refraction at this surface, the bundle of rays is widened until it reaches the exit surface characterized by the radius of curvature $r_3$. The bundle, diverging within the thick meniscus, again becomes a bundle of almost parallel rays on passing through $r_3$. Thus the diameter of the bundle leaving the meniscus depends on the thickness of the meniscus. The thicker the meniscus, the greater the diameter of the exiting bundle of rays. This is commonly expressed as follows: The telescopic magnification depends on the ratio of the refractive power to the central thickness. In changing this ratio, there arises an influence on the image aberration. In the case of the present invention, this ratio is chosen for the thick meniscus so that: (a) a sufficient spherical over-correction, usually lacking in optical systems, is present, but that (b) this spherical over-correction is not increased so much that additional zonal aberrations arise. At the same time, however, (c) the condition is fulfilled that the entrance pupil of this thick meniscus is located as near as possible to the vertex of the front surface. This results in a sufficient astigmatic over-correction and acts at the same time as an under-correction for coma.

Data for a lens according to the invention are given in the following table. This lens can be used with an image converter. It possesses an angular field of 50° at an $f$-number of $f:1.4$. It is still usable when an aperture of diameter approximately $1.7f$ is situated about $4.5f$ before the image plane. The symbols of the table are identified as follows: the various $r$'s are the radii of the surfaces as identified in the drawing; the $a$'s are the axial distances as identified in the drawing; $n_e$ is the index of refraction for the Fraunhofer line $e$; and $$v_e = \frac{n_e - 1}{n_{F'} - n_{C'}}$$

where $F'$ and $C'$ designate the corresponding Fraunhofer lines.

TABLE

|  |  | $n_e$ | $v_e$ |
|---|---|---|---|
| $r_1=-62.8$ | | | |
| | $a_1=23.4$ | 1.79192 | 25.52 |
| $r_2=138.9$ | | | |
| | $a_2=49..6$ | 1.79190 | 47.22 |
| $r_3=-108.6$ | | | |
| | $a_3=14.4$ | | |
| $r_4=588.0$ | | | |
| | $a_4=23.9$ | 1.76860 | 26.32 |
| $r_5=-262.5$ | | | |
| | $a_5=3.8$ | | |
| $r_6=103.8$ | | | |
| | $a_6=34.2$ | 1.69400 | 54.60 |
| $r_7=-164.1$ | | | |
| | $a_7=10.3$ | 1.79192 | 25.52 |
| $r_8=80.3$ | | | |
| | $a_8=1.7$ | | |
| $r_9=81.7$ | | | |
| | $a_9=23.2$ | 1.79190 | 47.22 |
| $r_{10}=219.4$ | | | |
| | $a_{10}=77.5$ | | |
| $r_{11}=-78.6$ | | | |
| | $a_{11}=8.5$ | 1.51871 | 63.96 |
| $r_{12}=229.1$ | | | |

The proportions shown in the drawing are shown to scale only for a preferred embodiment of the invention.

The proportions shown in the drawing are shown to scale only for a preferred embodiment of the invention.

What is claimed is:

1. A lens system of sufficient overall length to permit the positioning of an image recorder remote from an aperture, comprising: an objective member in the form of a meniscus which is so disposed as to present its concave face to impingent light and a basic lens member aligned with said objective member, a bundle of light rays impinging on the concave face of the meniscus from infinity exiting from the meniscus as a widened bundle of substantially parallel rays, said objective member being overcorrected with respect to spherical aberration and astigmatism and under-corrected with respect to coma, the basic lens member being oppositely over- and under-corrected, said objective member containing a chromatically over-corrected and monochromatically under-corrected cemented surface.

2. A lens system as claimed in claim 1, said basic lens member being a multielement lens.

3. A lens system as claimed in claim 1, further comprising a Smythe lens.

4. A lens system as claimed in claim 3, said objective member, basic lens member and Smythe lens being built and spaced in accordance with a spaced arrangement wherein said objective member is first and comprises two lenses having a total of three different surfaces; and basic lens member is second and comprises four lenses having a total of seven different surfaces; said Smythe lens is third and comprises one lens having two different surfaces; the following numerical data being descriptive of said lens system wherein $r$ represents the radii of curvature of said different surfaces $r_1$ being the first surface of the objective member struck by incident light and $r_{12}$ being the last surface of the Smythe lens; $a_1$, $a_2$, $a_4$, $a_6$, $a_7$, $a_9$ and $a_{11}$ represent the axial thicknesses of said lenses respectively starting with the first lens of the objective member struck by said incident light and ending with the Smythe lens; $a_3$ represents the axial distance between said objective member and said basic lens member; $a_5$ represents the axial distance between the first and second lenses of said basic lens member; $a_8$ represents the axial distance between the third and fourth lenses of said basic lens member; $a_{10}$ represents the axial distance between said basic lens member and said Smythe lens; $n_e$ represents the index of refraction for the Fraunhofer line $e$; and $$V_e = \frac{n_e - 1}{n_{F'} - n_{C'}}$$

where F' and C' designate the corresponding Fraunhofer lines:

TABLE

|  |  | $n_e$ | $v_e$ |
|---|---|---|---|
| $r_1=-62.8$ | | | |
| | $a_1=23.4$ | 1.79192 | 25.52 |
| $r_2=138.9$ | | | |
| | $a_2=49..6$ | 1.79190 | 47.22 |
| $r_3=-108.6$ | | | |
| | $a_3=14.4$ | | |
| $r_4=588.0$ | | | |
| | $a_4=23.9$ | 1.76860 | 26.32 |
| $r_5=-262.5$ | | | |
| | $a_5=3.8$ | | |
| $r_6=103.8$ | | | |
| | $a_6=34.2$ | 1.69400 | 54.60 |
| $r_7=-164.1$ | | | |
| | $a_7=10.3$ | 1.79192 | 25.52 |
| $r_8=80.3$ | | | |
| | $a_8=1.7$ | | |
| $r_9=81.7$ | | | |
| | $a_9=23.2$ | 1.79190 | 47.22 |
| $r_{10}=219.4$ | | | |
| | $a_{10}=77.5$ | | |
| $r_{11}=-78.6$ | | | |
| | $a_{11}=8.5$ | 1.51871 | 63.96 |
| $r_{12}=229.1$ | | | |

The proportions shown in the drawing are shown to scale only for a preferred embodiment of the invention.

5. A lens system as claimed in claim 1, the objective member excluding additional zonal aberration, and having its entrance pupil located adjacent to the vortex of its front surface.

References Cited
UNITED STATES PATENTS

| 2,423,676 | 7/1947 | Altman | 350—220 |
| 3,132,200 | 5/1964 | Muller et al. | 350—220 |

FOREIGN PATENTS

| 889,281 | 2/1962 | Great Britain. |
| 1,358,101 | 3/1964 | France. |

DAVID SCHONBERG, Primary Examiner

R. J. STERN, Assistant Examiner

U.S. Cl. X.R.
350—220, 230